(12) United States Patent
Epshtein et al.

(10) Patent No.: US 8,549,627 B2
(45) Date of Patent: Oct. 1, 2013

(54) DETECTION OF OBJECTIONABLE VIDEOS

(75) Inventors: Boris Epshtein, Bothel, WA (US); Eyal Ofek, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 891 days.

(21) Appl. No.: 12/484,199

(22) Filed: Jun. 13, 2009

(65) Prior Publication Data
US 2010/0316300 A1 Dec. 16, 2010

(51) Int. Cl.
H04L 29/06 (2006.01)
(52) U.S. Cl.
USPC .............................. 726/22; 726/26
(58) Field of Classification Search
USPC .............. 726/22, 26; 382/187, 229; 709/225
See application file for complete search history.

(56) References Cited

U.S. PATENT DOCUMENTS

| | | | | |
|---|---|---|---|---|
| 6,366,699 | B1 * | 4/2002 | Kuwano et al. | 382/199 |
| 7,222,158 | B2 * | 5/2007 | Wexelblat | 709/206 |
| 7,446,817 | B2 * | 11/2008 | Jung et al. | 348/468 |
| 7,464,264 | B2 | 12/2008 | Goodman et al. | |
| 7,706,614 | B2 * | 4/2010 | Smirnov | 382/182 |
| 7,769,751 | B1 * | 8/2010 | Wu et al. | 707/728 |
| 2002/0073429 | A1 * | 6/2002 | Beane et al. | 725/105 |
| 2002/0162118 | A1 * | 10/2002 | Levy et al. | 725/110 |
| 2003/0152269 | A1 * | 8/2003 | Bourbakis et al. | 382/187 |
| 2005/0216564 | A1 * | 9/2005 | Myers et al. | 709/206 |
| 2007/0133034 | A1 | 6/2007 | Jindal et al. | |
| 2007/0150276 | A1 | 6/2007 | Srivastava et al. | |
| 2007/0286499 | A1 * | 12/2007 | Freiburg et al. | 382/229 |
| 2008/0242221 | A1 * | 10/2008 | Shapiro et al. | 455/3.06 |
| 2008/0273795 | A1 | 11/2008 | Ofek et al. | |
| 2008/0319659 | A1 | 12/2008 | Horvitz et al. | |
| 2008/0319660 | A1 | 12/2008 | Horvitz et al. | |
| 2009/0077658 | A1 * | 3/2009 | King et al. | 726/21 |

OTHER PUBLICATIONS

Kim, et al., "Automatic System for Filtering Obscene Video", 10th International Conference on Advanced Communication Technology (ICACT 2008), Feb. 17-20, 2008, pp. 1435-1438, vol. 2.

Ching-Tung Wu, "Embedded-Text Detection and Its Application to Anti-Spam Filtering", retrieved at <<http://lbmedia.ece.ucsb.edu/resources/ref/thesis.pdf>>, dated Apr. 2005, pp. i-xiii and 1-71.

(Continued)

*Primary Examiner* — Chau Le

(57) ABSTRACT

A video that advertises a particular web site may be a form of video spam. For example, pornographers often advertise their web sites by displaying a link to their web sites in videos, and then placing the videos on video-sharing services. This type of video spam may be detected by analyzing the video for the presence of text and then determining whether the text is a URL. If the text is a URL, the URL may be checked to determine whether it points to an objectionable web site. The determination of whether a URL points to an objectionable web site may be made by comparing the URL with a blacklist and/or whitelist, or by retrieving the URL and analyzing the retrieved content. If a video is found to be an advertisement for an objectionable web site, action may be taken, such as removing the video from a content database.

20 Claims, 4 Drawing Sheets

(56) References Cited

OTHER PUBLICATIONS

Ye, et al., "A Robust Text Detection Algorithm in Images and Video Frames", retrieved at<<http://www.jdl.ac.cn/doc/2003/a%20robust%20text%20detection%20algorithm%20in%20images-%20and%20video%20frames.pdf>>, Fourth International Conference on Information, Communications & Signal Processing, Fourth IEEE Pacific-Rim Conference on Multimedia, Dec. 15-18, 2003, pp. 1-5.

Hess, et al., "A Video-Spam Detection Approach for Unprotected Multimedia Flows based on Active Networks", in Proceedings of the 30th EUROMICRO Conference (EUROMICRO '04), retrieved at <<http://www.tkn.tu-berlin.de/publications/papers1EM04_SSJD2_02.pdf>>, dated 2004, 5 pages.

Benevenuto, et al., "Identifying Video Spammers in Online Social Networks", in Proceedings of the 4th international workshop on Adversarial information retrieval on the web (AIRWeb '08), retrieved at<<http://airweb.cse.lehigh.edu/2008/submissions/benevenuto_2008_spam_video.pdf>>, dated Apr. 22, 2008, 8 pages, Beijing, China.

Huang, et al., "Detecting Moving Text in Video using Temporal Information", retrieved at<<http://ieeexplore.ieee.org/stamp/stamp.jsp?tp=&arnumber=4761417&isnumber=4760915>>, 19th International Conference on Pattern Recognition, 2008 (ICPR 2008), Dec. 8-11, 2008, pp. 4.

Karray, et al., "TEVI: Text Extraction for Video Indexing", retrieved at <<http://www.ast.net/SRO/sro4/third%20scope%20priorities-%20of%20scientific%20research%20and%20specialized%20-domains%20in%20science/Scientific%20areas%20of%20-priorities/Information%20and%20communication%20technology/Accepted/913P.pdf>>, dated: 2008, pp. 1-6.

* cited by examiner

DETECTION OF OBJECTIONABLE VIDEOS

BACKGROUND

Services that allow users to share videos on-line have become popular. In a typical service, a user uploads a video with tags that describe the video. The service maintains a searchable database of videos, and the user's video can appear in search results so that the video is findable and viewable by the world.

One issue that video-sharing services often have to address is that users may upload videos that the service does not want to show. One example of a video that the service might not want to show is a video that serves as an advertisement for a web site. Such a video may have image content, and also may have words referring a viewer to a particular web site—e.g., the video may display the Uniform Resource Locator (URL) of a web site superimposed across the images. In many cases, this type of video is used to advertise pornography, and the operator of the video sharing service may want to avoid being involved in the promotion of pornography. Thus, the operator of a video-sharing service may wish to treat videos that advertise web sites differently from other videos.

SUMMARY

Video spam that refers users to pornographic web sites (or other objectionable web sites) may be detected by analyzing the video for the presence of text. A typical objectionable video acts as an advertisement for a web site, and contains the URL of the web site superimposed across the video. Videos may be analyzed to determine the presence of superimposed text. Typical videos that serve as advertisements for web sites display a URL in a fixed location, so searching for pixels that remain relatively consistent across several temporal frames of video is a reliable marker for the presence of text. When a region of the video has been identified as containing relatively consistent pixels, the color depth of pixels in that region is reduced to small number of bits (e.g., two bits per color channel), which has the effect of rounding similarly-colored pixels to the same value.

Neighboring pixels that have the same depth-reduced color value are grouped together, and the geometry of these neighboring pixels is analyzed to detect the presence of the kinds of lines and curves that would be part of characters. In one example, an optical character recognition (OCR) process may be performed on these lines and curves to recover lines of text. The recovered text may then be analyzed to determine whether the text appears to be a URL (e.g., by checking for typical URL strings, such as "www", ".com", "http", etc.). (In greater generality, any type of recognition process could be used to identify text in a video; the subject matter herein is not limited to any particular process for determining what text a video contains.) If the text appears to contain a URL, then the text may be compared with a blacklist. The blacklist contains a list of sites that are known to be associated with video spam (e.g., pornographic web sites that are known to advertise through video-sharing services). The text may also be compared with a whitelist, which may contain lists of sites that are known not to be associated with video spam. Since there may be some imprecision in the OCR process that is used to recover text from video, the comparison of the text with the blacklist and/or whitelist may tolerate some divergence between the recovered string and items on the blacklist and/or whitelist. For example, some form of fuzzy matching could be used (e.g., determining that the Levenshtein distance between the strings is less than some amount, or some other fuzzy matching technique).

If the spam/non-spam status of a video cannot be resolved based on the blacklist and/or whitelist (or if the spam-detection process does not use a blacklist or whitelist), then the URL recovered from the video may be retrieved, and the content retrieved from the URL may be analyzed for markers that are commonly associated with video spam. E.g., the site may be analyzed for specific keywords, specific image patterns, etc. Additionally, even if a URL is not found in a video, the presence of certain names, keywords, etc., might suggest the presence of spam, and videos containing such names, keywords, etc., could be treated accordingly.

If a video is determined to be associated with spam, then action may be taken on the video. For example, the provider of a video-sharing service may remove the video from its database of video content so that the video will not be viewable on that provider's web site. Or, the provider could keep the video in the database while also penalizing the video in a search scoring algorithm, so that the video would appear relatively low in search results.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
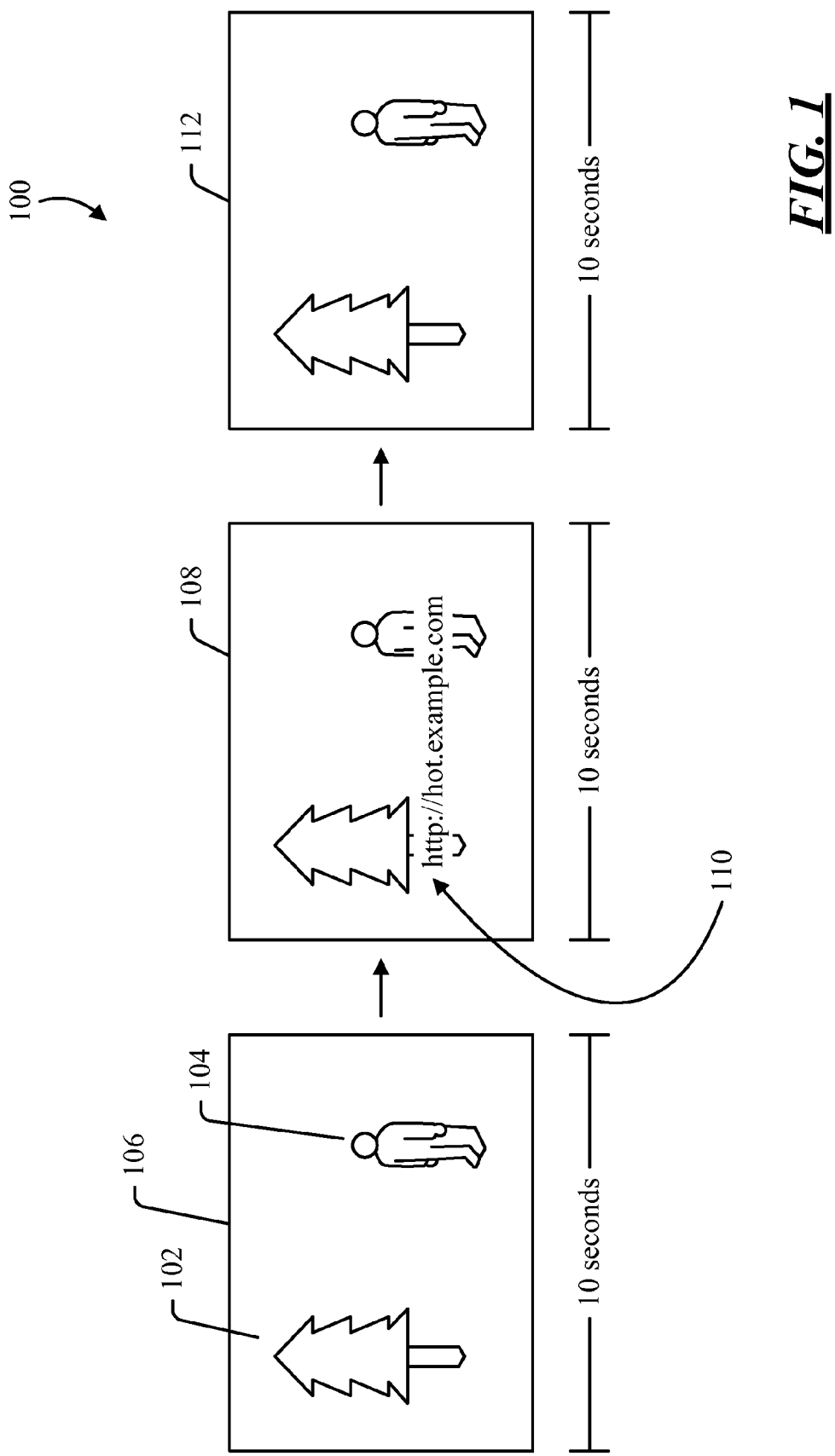
FIG. 1 is a block diagram of an example video that may be analyzed.

The popularity of video-sharing services has led to a form of abuse referred to as video spam. Video spam takes many forms, but what the different kinds of video spam have in common is that they dilute a video-sharing service's content library with irrelevant or inappropriate content. This dilution tends to devalue the service's content library, by making it harder for users to find relevant or appropriate content with that service. Video sharing services allow users to search for videos on their sites, and providers of these services generally want to be known for being able to provide relevant content in response to a search query. These service providers may also want to be known for their ability to filter out certain types of content (e.g., pornography). The reputation of a particular video-sharing service, and even the ability to monetize the service, may depend on the service provider's ability to ensure that the site can respond to a search query with video content that is relevant and appropriate. Video spam interferes with the site's ability to do so, and thus video-sharing services have reason to try to eliminate video spam from their sites.

One type of video spam is the video that serves primarily as an advertisement for a web site. There are various reasons why a video sharing service might want to remove these types of videos from its content database—or, at least, not to feature them in search results. First, this type of video is unlikely to be perceived as having much content value to a person who finds it in response to a search, so the presence of such a video in a set of search results tends to foster the impression that the video service contains irrelevant content. Second, many of the web sites that are advertised in videos are pornographic web sites. While video services use various techniques to detect actual pornography in videos, videos that merely advertise pornography often contain only mild content that escapes detection. However, parents who rely on "safe search" filters may object to their children being exposed to videos that advertise pornography as much as they object to videos that actually contain pornography. Third, video-sharing services, like other content and search providers, often rely on advertising as a revenue source, and videos that contain unpaid advertisements undermine that revenue source. Thus, a provider of an on-line video-sharing service has various incentives to take action against videos that serve mainly to advertise other web sites.

The subject matter herein may be used to detect videos that serve to advertise web sites, and to take action based on that detection. Videos are analyzed to detect the presence of Uniform Resource Locators (URLs) (or some other type of text string, such as names or keywords associated with a particular supplier). When URLs are found in a video, the URLs, are compared with lists of web sites that are known to contain pornography, or that are otherwise associated with content that the provider of the video-sharing service does not want to promote. If the video is found to contain the URL of such a site, then the provider of the video-sharing service may take action, such as removing the video from its content database, lowering the video's score in search rankings, or taking some other action.

Turning now to the drawings, FIG. 1 shows an example video 100 that may be analyzed to determine the presence of spam. Video 100, in this example, is a thirty-second video, although video 100 could be of any length. Video 100 may contain moving images of various objects. In example video 100, a tree 102 and a person 104 are shown, although video 100 could contain any kind of images. In the first ten-second segment of video 100 (segment 106) only objects are present in the video. In the second ten-second segment (segment 108), a URL 110 is superimposed over the objects. In the third ten-second segment (segment 112), URL 110 is gone, and only the objects are shown again. (URL 110 is an example of a text string, although the subject matter herein could be used to detect, and to take action in response to, any type of text string that is present in video 100.) Video 100 is a typical example of video spam that is used to advertise a web site. When such a video is used to advertise a web site, the video typically shows the URL of the web site to be advertised for a few seconds in the middle of the video. This type of video is commonly used to promote pornography, although such videos could be used to promote any type of web site. The subject matter herein may be used to detect videos that advertise web sites, so that the operator of a video-sharing service can remove such videos from its content database, or can take some other action.

Figure 2:
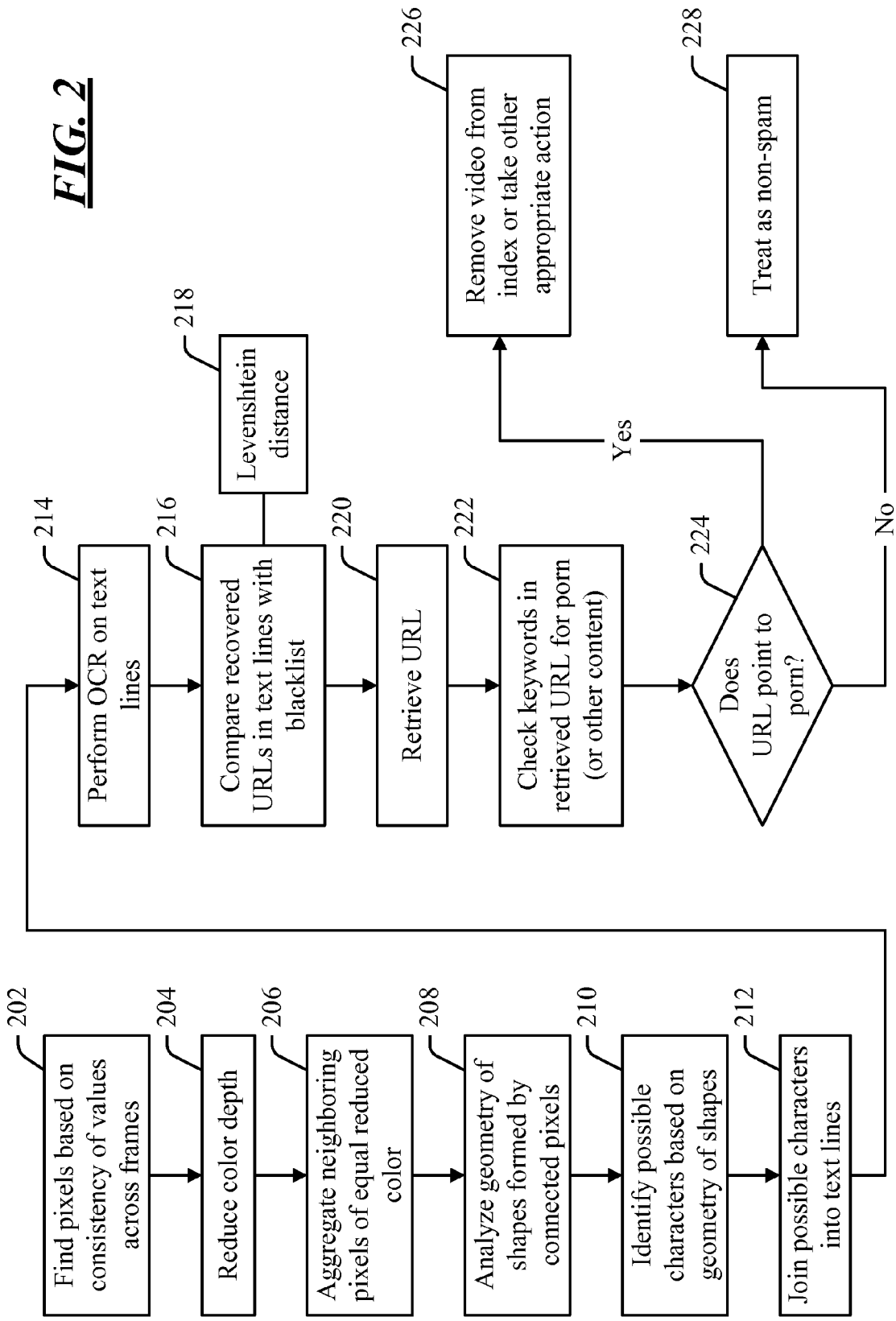
FIG. 2 is a flow diagram of an example process that may be used to detect videos that advertise web sites, and to take action when such videos are detected.

FIG. 2 shows an example process that may be used to detect videos that advertise web sites, and to take action when such videos are detected. Before turning to a description of FIG. 2, it is noted that FIG. 2 shows an example in which stages of a process are carried out in a particular order, as indicated by the lines connecting the blocks, but the various stages shown in these diagrams can be performed in any order, or in any combination or sub-combination.

At 202, a video is analyzed to identify pixels that have consistent values across temporal frames. This action is taken to identify pixels that may be part of words, numbers, or symbols. In general, objects in videos tend to move, but a superimposed URL tends to remain relatively unchanged across several seconds of video. Thus, identifying pixels that remain the same (or relatively similar) across many several temporal frames suggests which pixels are part of a URL (or at least which pixels may be part of text characters). For example, pixels could be identified that do not differ across temporal frames, or whose level of difference across temporal frames does not exceed some threshold. For efficiency in analyzing the video, further analysis could be limited only to pixels that retain some level of consistency across several temporal frames (although if efficiency can be sacrificed, further analysis could be performed on the entire video or on any portion thereof).

At 204, the color depth of the identified pixels may be reduced to a small number of bits per channel, thereby creating depth-reduced pixels. (A "small" number of bits, in this context, indicates that the depth-reduced pixels have fewer bits per color channel than the original pixels.) For example, if pixels are represented by red, green, and blue components, then each of these components may be represented in some small number of bits, such as two bits per color channel. Reducing color depth to a small number of bits per channel tends to cause similar pixels to be rounded to the same depth-reduced value.

After the color depth of the pixels has been reduced, neighboring depth-reduced pixels that have the same reduced value may be aggregated together (at 206). The presumption behind this aggregation is that neighboring pixels that have the same color (or, at least, that have been rounded to the same color as a result of color depth reduction) are likely to be part of a continuous line or curve, which may be part of a print character. Thus, an analysis is made (at 208) of the geometry of shapes formed by connected pixels of the same color. As a result of the analysis, those shapes that are possible characters are identified (at 210).

At 212, the possible characters are joined into text lines. At 214, an optical character recognition (OCR) process may be performed on the text lines. Any OCR process may be used. The OCR process may result in recovering text from the portions of the image that are identified as being possible characters.

The actions described at 202-214 are one example way of performing text detection on a video. However, analysis of a video to recover text could be performed in any way, and the subject matter herein is not limited to this example. For example, a text detection algorithm could take into account the presence of text that moves throughout the video, in which case the text detection technique might not look specifically for pixels that remain consistent across temporal frames. Or, text could change colors, in which case the technique might not use the above-described color-depth-reduction technique to increase contrast between text and background pixels. One example way to find text in a video is to look for areas that have a consistent stroke width. Or, for horizontal text, one can look at the amount of vertical gradients, and identify rows that have many gradients that are bounded above and below by rows that have a low gradient counts. In general, any text detection technique could be used.

Any type of text might be recovered by an OCR process. The text can be analyzed to determine whether the text is a URL. For example, the presence of strings such as ".com", "http", "www", etc., might indicate that the text is a URL. Similarly, the presence of certain names or keywords that are known to be associated with a particular supplier could be treated as a marker for the presence of spam. A system that implements the process of FIG. 2 may maintain a blacklist of URLs whose appearance in a video is associated with spam. For example, the blacklist might be a list of known pornographic web sites, or a list of sites that are considered objectionable for some other reason (or that otherwise contain material that is not to be advertised or promoted on a particular video-sharing site). If the text is found to be a URL, then, at 216, the URL may be compared with the blacklist to determine whether the URL is on the blacklist.

Recovering text from video is an imprecise process, so there may be some inaccuracies in the text recovered. Thus, the process of comparing a recovered URL with a blacklist may find that the recovered URL appears on the blacklist even in the case where the recovered text and an item on the blacklist do not match exactly. For example, a system that implements the process of FIG. 2 could apply the concept of Levenshtein distance (at 218) between two strings, and could find that a match exists as long as the Levenshtein distance is less than some amount. For example, the Levenshtein distance between the recovered text and an item on the blacklist could be calculated, and a match could be found if the Levenshtein distance does not exceed some constant N. Or, the matching threshold could be defined as a function of the length of the text that is being compared—e.g., a match could be found if the Levenshtein distance between the recovered text and an item on the blacklist does not exceed one-fourth of the length of the recovered text. Determining that the Levenshtein distance between two strings is less than some amount is an example of a fuzzy matching technique for strings, although any type of fuzzy matching technique could be used.

A whitelist could be maintained that lists URLs that are known not to be associated with spam. Comparison between recovered text and items on the whitelist could be performed in the same manner as comparison between recovered text and items on the blacklist. For example, a match between non-identical strings could be found if the Levenshtein distance between the recovered text and an item on the whitelist does not exceed some threshold. (Or, comparison between the URL and items on the whitelist could use some other fuzzy matching technique.) A system that implements the process of FIG. 2 could use a blacklist, a whitelist, both, or neither.

If the URL is on the whitelist, then the video that contains the URL may be treated as non-spam. If the URL is on the blacklist, then the video that contains the URL may be treated as spam, and some action may be taken with regard to the video. Examples of actions that may be taken are to remove the video from a content database, or to penalize the score assigned to the video by a search engine, thereby reducing the video's ranking in search results.

However, some videos may appear on neither the blacklist nor the whitelist. Moreover, some implementations might not use blacklists and/or whitelists. If a recovered URL has not been found on the blacklist or whitelist (either because it is not present on either of those lists, or because blacklists and/or whitelists are not being used as part of the process), then an attempt may be made to determine whether the URL is, or is not, associated with spam. For example, the URL could be accessed to retrieve data (at 220), and the retrieved data could be analyzed for keywords that are associated with pornography (at 222). (Or, if the process of FIG. 2 is being used to detect some type content other than pornography, then the retrieved data could be analyzed for keywords associated with that type of content.) If the URL is found (at 224) to point to data that contains pornography (or some other kind of content), then tangible action may be taken (at 226). Examples of such action include removing the video from a content database, lowering the video's search score, etc. In general, these actions may serve to reduce or eliminate the visibility of the spam video, thereby preventing or deterring people from using the video-sharing site to advertise certain types of web sites. On the other hand, if the URL is found not to contain pornography (or, more generally, is found not to contain the kind of content that the process of FIG. 2 is trying to detect), then the video may be treated as non-spam (at 228).

As noted above, pornography is one example of content that could be detected. However, there are various other types of content that are associated with video spam, and the actions taken at 220-228 could be used to detect any type of content. Given any type of content, a URL could be analyzed for the presence of keywords (or images, or any type of pattern) associated with that content. URLs containing those keywords (or images, or pattern) could be treated as being associated with spam, and appropriate action could be taken.

Figure 3:
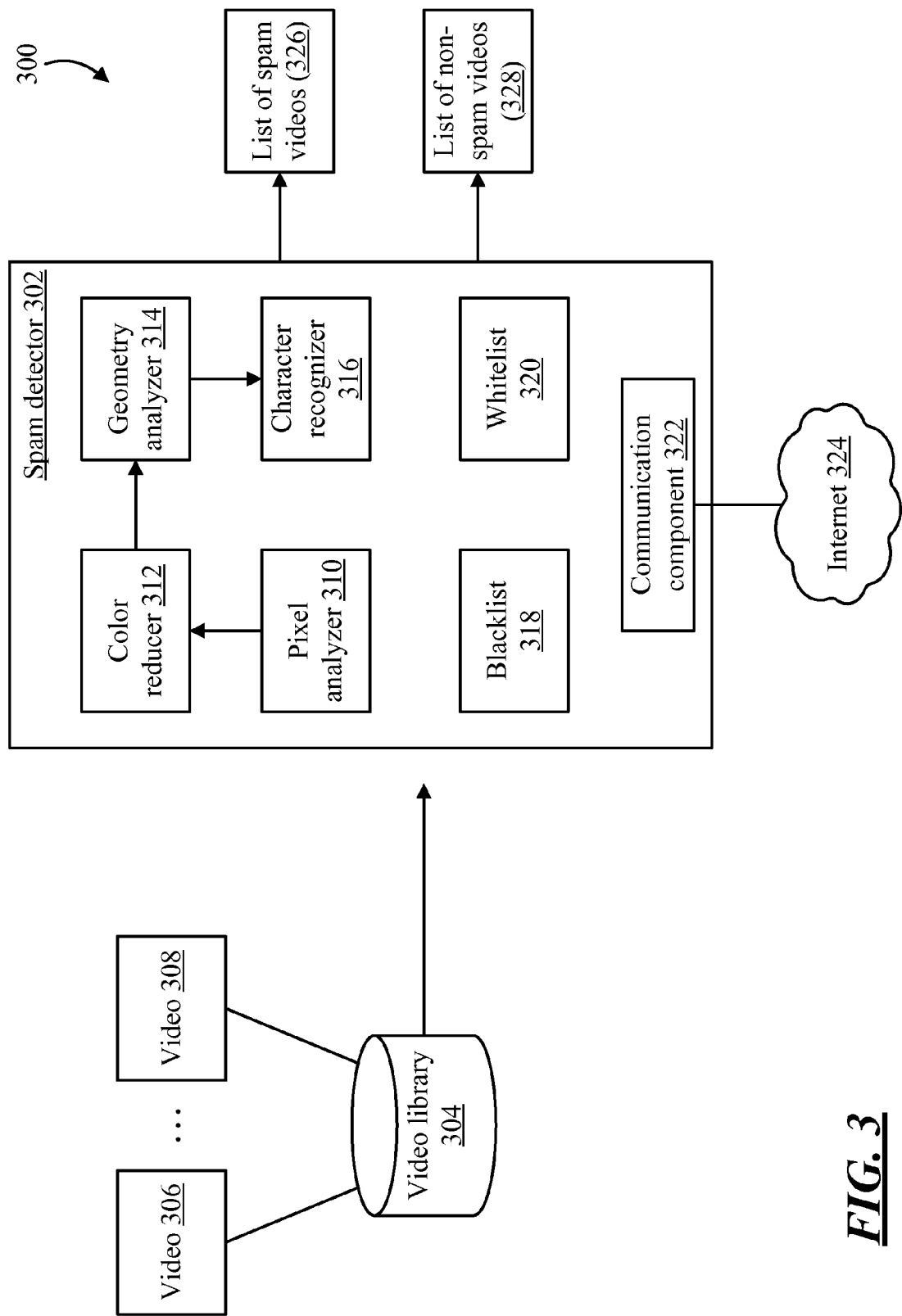
FIG. 3 is a block diagram of an example system that may be used to detect video spam.

FIG. 3 shows an example system 300 that may be used to detect video spam. System 300 may comprise a spam detector 302. Spam detector 302 may be implemented in any manner—e.g., as software, as hardware, as a combination thereof, etc. Spam detector 302 receives videos from a video library 304. In the example of FIG. 3, video library 304 contains a plurality of videos, such as video 306 and video 308. Video library 304 may contain videos that have been provided to a particular video-sharing service, and/or videos that are viewable through that service.

Spam detector 302 may comprise various components. The components in spam detector 302 may vary depending on the type of algorithms that spam detector 302 implements (e.g., different types of text detection algorithms may use different components.) In one example, however, spam detector 302 may have pixel analyzer 310, color reducer 312, geometry analyzer 314, and character recognizer 316. These components may perform various actions that are discussed above in connection with FIG. 2. For example, pixel analyzer 310 may evaluate frames of video to determine which pixels remain relatively consistent across frames. Color reducer 312 may take the pixels identified by pixels analyzer and may reduce the color depth of those pixels to a relatively small number of bits. Geometry analyzer 314 may analyze neighboring groups of pixels that have the same reduced color to determine whether they are part of a contiguous line or curve. Character recognizer 316 may perform an OCR process on the lines and curves identified by geometry analyzer 314 to determine whether those lines or curves are part of characters. Thus, these components may be used to identify the presence of text in a video.

Inasmuch as a URL in a video may be associated with spam, spam detector 302 may use various heuristics to identify text that appears to be part of a URL. For example, the presence of strings such as "http", ".com", "www", etc. may suggest that text found in a video is a URL. When text has been identified as a URL, spam detector 302 may attempt to determine whether the URL is associated with spam. For example, spam detector 302 may consult blacklist 318 and/or whitelist 320. As noted above, blacklist 318 may contain a list of URLs that are known to be associated with spam, and whitelist 320 may contain a list of URLs that are known not to be associated with spam. If a URL recovered from a video does not appear on either blacklist 318 or on whitelist 320 (or if spam detector 302 operates without using a blacklist and/or whitelist), then spam detector 302 may attempt to determine whether the URL is associated with spam by analyzing the content retrieved from the URL. Thus, spam detector 302 may comprise, or otherwise may make use of, a communication component 322 (e.g., a network interface that allows spam detector 302 to communicate through a network such as the Internet 324), so that spam detector 302 can retrieve content from the recovered URL and can analyze the content. For example, spam detector 302 might look for keywords, images, etc., that are associated with pornographic web sites.

Spam detector 302 attempts to sort videos into those that are associated with spam, and those that are not. Thus, spam detector 302 may produce a list 326 of spam videos and a list 328 of non-spam videos. System 300 may take action on a video depending on whether the video is spam or non-spam. For example, as noted above, videos that are associated with spam may be excluded from the content database that is offered by an on-line video-sharing web site, or may have their scores downgraded to reflect that spam videos tend to have lower relevance that non-spam videos. Conversely, if a video is found not to be associated with spam, then action may be taken such as including the video in a content database.

Figure 4:
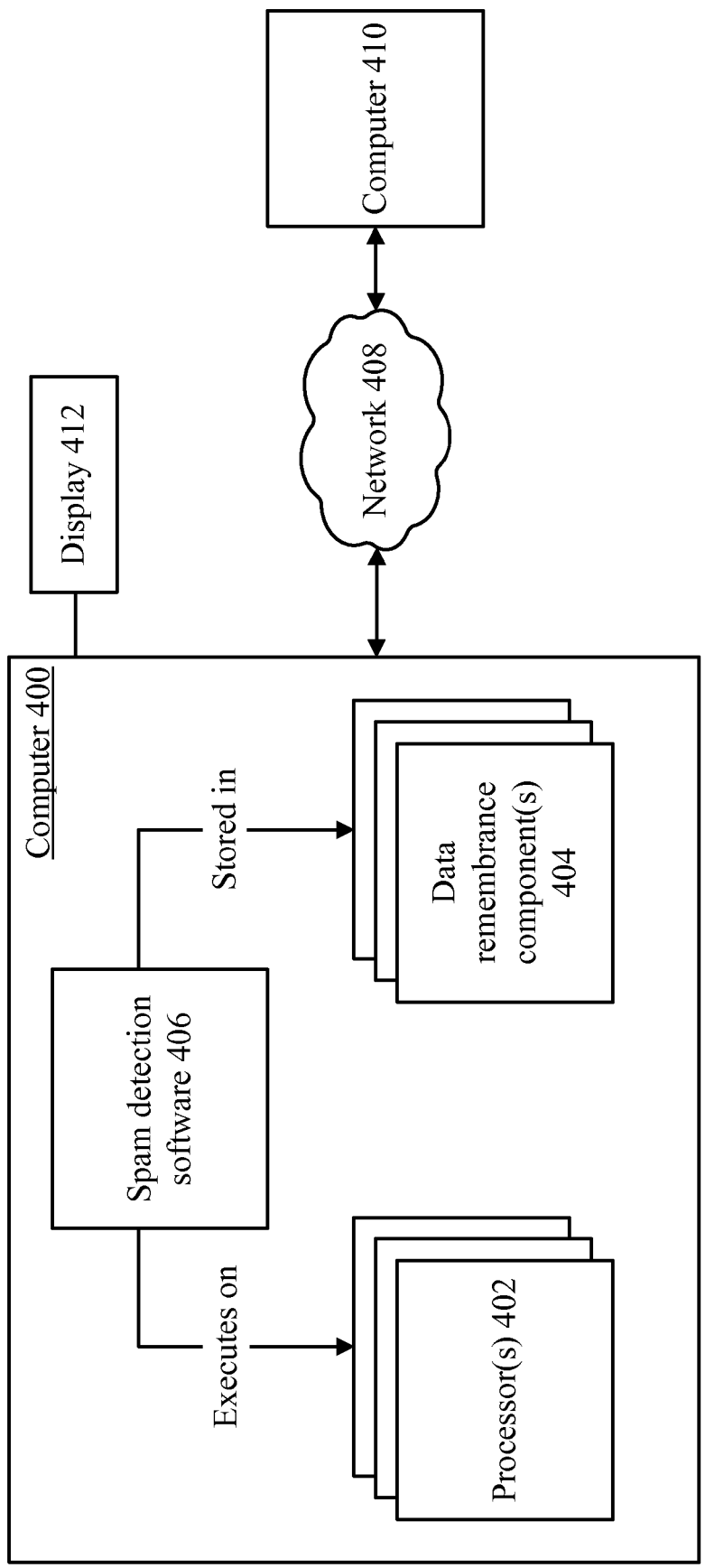
FIG. 4 is a block diagram of example components that may be used in connection with implementations of the subject matter described herein.

FIG. 4 shows an example environment in which aspects of the subject matter described herein may be deployed.

Computer 400 includes one or more processors 402 and one or more data remembrance components 404. Processor(s) 402 are typically microprocessors, such as those found in a personal desktop or laptop computer, a server, a handheld computer, or another kind of computing device. Data remembrance component(s) 404 are components that are capable of storing data for either the short or long term. Examples of data remembrance component(s) 404 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 400 may comprise, or be associated with, display 412, which may be a cathode ray tube (CRT) monitor, a liquid crystal display (LCD) monitor, or any other type of monitor.

Software may be stored in the data remembrance component(s) 404, and may execute on the one or more processor(s) 402. An example of such software is spam detection software 406, which may implement some or all of the functionality described above in connection with FIGS. 1-3, although any type of software could be used. Software 406 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 4, although the subject matter described herein is not limited to this example.

The subject matter described herein can be implemented as software that is stored in one or more of the data remembrance component(s) 404 and that executes on one or more of the processor(s) 402. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 402) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 400 may be communicatively connected to one or more other devices through network 408. Computer 410, which may be similar in structure to computer 400, is an example of a device that can be connected to computer 400, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage devices that store executable instructions that, when executed by a computer, cause the computer to perform acts comprising:
analyzing a video to identify text contained in said video, said video having a first color depth, said analyzing comprising:
reducing one or more pixels in said video to a second color depth that is a smaller number of bits than said first color depth;
identifying those depth-reduced pixels that neighbor each other and that have the same depth-reduced color values as each other; and
analyzing geometry of the identified depth-reduced pixels to identify shapes that are associated with text characters;
determining that said text comprises a Uniform Resource Locator (URL);
determining that said URL is associated with content that is not to be advertised on a video-sharing service to which said video has been provided; and
taking a tangible action to reduce or eliminate visibility of said video on said video sharing service.

2. The one or more computer-readable storage devices of claim 1, wherein said analyzing comprises:
identifying pixels in said video whose values retain a level of consistency across a plurality of temporal frames.

3. The one or more computer-readable storage devices of claim 1, wherein said reducing is performed only on pixels that have values that have been found to retain a level of consistency across a plurality of temporal frames.

4. The one or more computer-readable storage devices of claim 1, wherein said analyzing further comprises:
performing an optical character recognition (OCR) process on said shapes to identify said text in said video.

5. The one or more computer-readable storage devices of claim 1, wherein said acts further comprise:
comparing said URL with a blacklist that identifies web sites that are associated with video spam,
wherein said URL is found, based on said URL's presence on said blacklist, to be associated with content that is not to be advertised on said video-sharing service.

6. The one or more computer-readable storage devices of claim 5, wherein said comparing comprises:
   determining that said URL is on said blacklist by performing a fuzzy match between said URL and said item on said blacklist.

7. The one or more computer-readable storage devices of claim 5, said comparing of said URL with said blacklist comprising a determination as to whether said URL is within a Levenshtein distance of an item on said blacklist.

8. The one or more computer-readable storage devices of claim 1, wherein said acts further comprise:
   comparing said URL with a whitelist that identifies web sites that are known not to be associated with video spam.

9. The one or more computer-readable storage devices of claim 1, wherein said acts further comprise:
   retrieving data from said URL; and
   determining that said data includes content that is not to be advertised on said video sharing service.

10. The one or more computer-readable storage devices of claim 1, wherein said video sharing service maintains a database of videos, and wherein said tangible action comprises:
    excluding said video from said database.

11. The one or more computer-readable storage devices of claim 1, wherein said video sharing service provides a search engine that allows users to search for videos, and wherein said tangible action comprises:
    based on said video having been found to contain a URL that is associated with content that is not to be advertised on a video-sharing service, penalizing said video in a scoring process implemented by said search engine.

12. A method of detecting videos that promote web sites, the method comprising:
    using a processor to perform acts comprising:
      identifying text that appears in a video by performing acts comprising:
        finding pixels in said video that retain a level of consistency across temporal frames of said video, said pixels having a first color depth;
        reducing said pixels from said first color depth to a second color depth that has a smaller number of bits than said first color depth; and
        analyzing geometry of those ones of said pixels that have the same depth-reduced colors to identify shapes;
      determining that said text comprises a string;
      comparing said string with a blacklist to determine whether said string refers to content that is not to be promoted on a video-sharing service to which said video has been provided;
      determining that said string is on said blacklist; and
      excluding said video from a database maintained by said video-sharing service.

13. The method of claim 12, wherein said determining that said string is on said blacklist comprises:
    comparing said string with an item on said blacklist;
    determining that there is a fuzzy match between said string.

14. The method of claim 12, wherein said identifying text that appears in said video comprises:
    performing a character recognition process on said shapes.

15. The method of claim 12, wherein said string comprises a Uniform Resource Locator (URL), and wherein said acts further comprise:
    retrieving data from said URL; and
    determining whether said data comprises keywords that are associated with content that is not to be promoted on a video-sharing service.

16. A system for detecting, in videos, advertisements for web sites, the system comprising:
    a processor;
    a data remembrance component; and
    a detector that is stored in said data remembrance component and that executes on said processor, the detector receiving a video from a video library, the detector comprising:
      a pixel analyzer that identifies pixels in said video that retain a level of consistency across a plurality of temporal frames, each of the pixels having a first color depth;
      a color reducer that reduces the identified pixels to a second color depth that is less than the first color depth, thereby creating depth-reduced pixels;
      a character recognizer that identifies text in the depth-reduced pixels; wherein said detector compares said text with a blacklist to determine whether said text comprises a Uniform Resource Locator (URL) of a web site that is not to be advertised on a video-sharing service to which said video has been provided, and wherein said detector, upon finding that said text comprises a URL of a web site that is not to be advertised on said video-sharing service, takes a tangible action to reduce visibility of said video on said video sharing service; and
      a geometry analyzer that identifies shapes formed by contiguous sets of depth-reduced pixels that have the same depth-reduced color values as each other, wherein said character recognizer identifies said text by analyzing said shapes.

17. The system of claim 16, wherein said detector further compares said text with a whitelist, wherein said whitelist identifies URLs of web sites that are not associated with content that is not to be promoted on said video-sharing service.

18. The system of claim 16, further comprising:
    a communication component, wherein said detector retrieves data from said URL through said communication component, and wherein said detector analyzes said data for presence of keywords associated with content that is not to be promoted on said video-sharing service.

19. The system of claim 16, wherein said video-sharing site maintains a database of videos that are viewable on said video-sharing site, and wherein said tangible action comprises removing or excluding said videos from said database.

20. The system of claim 16, said detector comparing said text with said blacklist by determining whether said text is within a Levenshtein distance of an item on said blacklist.

\* \* \* \* \*